(12) United States Patent
Harguth et al.

(10) Patent No.: US 10,958,089 B2
(45) Date of Patent: Mar. 23, 2021

(54) WEARABLE DEVICE CHARGER

(71) Applicant: The Prophet Corporation, Owatonna, MN (US)

(72) Inventors: Alison Marie Harguth, Owatonna, MN (US); Amber Lee Orenstein, Prior Lake, MN (US); Jason Butler Koberstine, Apple Valley, MN (US)

(73) Assignee: The Prophet Corporation, Owatonna, MN (US)

( * ) Notice: Subject to any disclaimer, the term of this patent is extended or adjusted under 35 U.S.C. 154(b) by 273 days.

(21) Appl. No.: 15/352,140

(22) Filed: Nov. 15, 2016

(65) Prior Publication Data

US 2018/0138726 A1    May 17, 2018

(51) Int. Cl.
*H02J 7/00* (2006.01)

(52) U.S. Cl.
CPC .......... *H02J 7/0044* (2013.01); *H02J 7/0027* (2013.01); *H02J 7/00* (2013.01)

(58) Field of Classification Search
CPC .............................. H02J 7/0044; H02J 7/0027
USPC ......................................... 320/107, 112–115
See application file for complete search history.

(56) References Cited

U.S. PATENT DOCUMENTS

| | | |
|---|---|---|
| D425,866 S | 5/2000 | Nagasawa et al. |
| D597,939 S | 8/2009 | Tkachuk |
| D705,189 S | 5/2014 | Chovin et al. |
| D731,420 S | 6/2015 | Croft et al. |
| 9,276,366 B1 | 3/2016 | Flores |
| D784,835 S | 4/2017 | Kim et al. |
| D789,883 S | 6/2017 | Luke et al. |
| D790,458 S | 6/2017 | He et al. |
| D799,423 S | 10/2017 | Eliyahu |
| 2009/0212738 A1* | 8/2009 | Coonan ................. H02J 7/0027 320/113 |
| 2011/0234154 A1* | 9/2011 | Navid .................... H02J 7/0045 320/108 |
| 2013/0132307 A1 | 5/2013 | Phelps et al. |
| 2015/0356060 A1* | 12/2015 | Peden ..................... G06F 17/24 715/255 |
| 2016/0181851 A1* | 6/2016 | Porat ....................... H02J 7/025 320/108 |
| 2016/0233701 A1* | 8/2016 | Gliatis .................. H02J 7/0027 |
| 2016/0276852 A1* | 9/2016 | Roberts ................. H02J 7/0027 |
| 2016/0365190 A1* | 12/2016 | Jeong ....................... H01F 38/14 |
| 2017/0047751 A1* | 2/2017 | Fernandes ............. H02J 7/0044 |
| 2017/0093200 A1* | 3/2017 | Green ..................... H02J 7/025 |
| 2017/0155259 A1* | 6/2017 | Mecca ................... H02J 7/0044 |
| 2017/0264112 A1* | 9/2017 | Tandai ...................... H02J 7/00 |
| 2018/0219392 A1* | 8/2018 | Dittrich ................. G04C 10/00 |
| 2019/0109474 A1* | 4/2019 | Yang ..................... H02J 7/0044 |

* cited by examiner

*Primary Examiner* — Nathaniel R Pelton
(74) *Attorney, Agent, or Firm* — Merchant & Gould P.C.

(57) ABSTRACT

Wrist-mounted monitors (e.g., heart rate monitors) can include rechargeable power sources, which can be recharged at a single charging base. Each of the monitors can be placed at a respective charging station of the charging base. Power is supplied to the charging base (e.g., via a cable) from an electrical outlet, a computer, or other power source. The charging stations are shaped and sized to accommodate the wristbands of the monitors.

9 Claims, 9 Drawing Sheets

WEARABLE DEVICE CHARGER

BACKGROUND

Some portable electronic devices run on rechargeable power sources, such as batteries. Under normal operating conditions, the rechargeable power source must be frequently recharged. One manner of recharging the power source is to use a wired charger that requires a household alternating-current (AC) source to supply the charging energy directly to the device.

SUMMARY

Some aspects of the disclosure are directed to a charging arrangement including a housing, electrical interfaces, and electrical circuitry. The housing having a length that is larger than either a width or a depth of the housing. The housing defines a plurality of charging stations along the length. The electrical interfaces are coupled to the housing. Each electrical interface is disposed to protrude from the housing at a respective one of the charging stations. The electrical circuitry provides power to the electrical interfaces.

In certain implementations, the charging stations are aligned in a row extending along the length.

In certain implementations, each charging station extends along a width of the housing between open ends.

In certain implementations, the housing is configured to stand upright on the first end.

In certain implementations, the first end of the housing defines a base having a cross-dimension that is larger than any cross-dimension of the remainder of the housing.

In certain implementations, each charging station includes a shelf.

In certain implementations, the housing defines a port electrical coupled to the electrical circuitry. The port is configured to receive a plug that supplies power. In certain examples, the port is configured to receive a USB plug, a micro-USB plug, an RJ-45 plug, DC power jack, or other plug terminating a cable capable of carrying power.

In certain implementations, a magnet is disposed at each charging station. In certain implementations, wearable electronic devices each have a magnetic portion that is attracted to the magnets at the charging stations.

In certain implementations, each charging station defines a groove shaped to receive a wearable electronic device. Each groove extends along a width of the housing between opposite sides.

In certain implementations, the housing has a depth extending between a front and a rear. The charging stations are disposed at the front of the housing.

In certain implementations, each groove has a generally flat section at the front of the housing and contoured sections extending from the flat section towards respective ones of the opposite sides of the housing.

In certain implementations, the housing extends sufficiently rearward from the front of the housing to accommodate wristbands of the wearable electronic device.

Other aspects of the disclosure are directed to a recharging system for recharging electronic wristband devices. The recharging system includes a housing and electronic devices. The electronic devices each include a rechargeable power source having an electrical interface. Each electronic device has a display and a wristband configured to hold the electronic device to a wrist of a user so that the display faces outwardly from the wrist. The housing defines charging stations extending in a row. Each charging station defines a groove sized and shaped to receive one of the electronic devices. Each groove is sized and shaped to accommodate at least part of the wristband of the respective electronic device. The housing defines a power port from which electrical circuitry extends to a power interface at each charging station. Each power interface aligns with the electrical interface of the respective electronic device when the electronic device is received at the respective charging station.

In certain implementations, the wristband is sufficiently flexible to enable a user to form the wristband in a desired position. The wristband also is sufficiently stiff to hold the desired position once formed.

In certain implementations, the wristbands include formable metal plates covered in plastic. In certain examples, the metal plates are overmolded in plastic.

In certain implementations, the housing is configured to stand upright on a surface so that the row of charging stations extends away from the surface. In certain examples, the housing includes a base configured to seat on the surface. The base has a largest cross-dimension of the housing.

In certain implementations, the charging stations are defined at a front of the housing.

In certain implementations, sides of the housing extend sufficiently rearward to take up some slack of the wristbands when the electronic devices are disposed at the charging stations.

In certain implementations, a shelf is disposed at each charging station to aid in retaining the respective electronic device at the charging station.

In certain implementations, the power port is defined at an opposite side of the housing from the charging stations.

In certain implementations, each charging station includes a magnet having a first polarity; each electronic device includes a magnet having a second polarity that is different than the first polarity.

In certain implementations, the electronic devices include heart rate monitors.

According to other aspects of the disclosure, a method of recharging a plurality of wrist-mounted monitors includes positioning each wrist-mounted monitor at a respective charging station of a charging arrangement housing so that an electrical interface of the wrist-mounted monitor engages the electrical interface of the respective charging station; and powering the electrical interfaces of the charging stations.

In certain implementations, powering the electrical interfaces of the charging station comprises plugging a power cable into a power port defined in the charging arrangement housing. The power port is electrically coupled to the electrical interface of each charging station.

In certain implementations, the method also includes magnetically securing each of the wrist-mounted monitors to the respective charging station.

In certain implementations, the method also includes seating each wrist-mounted on a shelf at the respective charging station.

In certain implementations, the method also includes forming wristbands of the wrist-mounted monitors around a rear of the charging arrangement housing to further secure the wrist-mounted monitors to the charging arrangement housing.

In certain implementations, the method includes seating each wrist-mounted monitor on a shelf at the charging station, magnetically attaching the monitor to the charging station, and forming the wristband around the housing to hold the monitor at the charging station.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

The present disclosure is directed to a charger for multiple portable electronics devices. In particular, the charger is configured to receive and charge multiple wearable electronic devices. In certain examples, the charger defines multiple charging stations that are each shaped and configured to receive wristband electronics devices.

Figure 1:
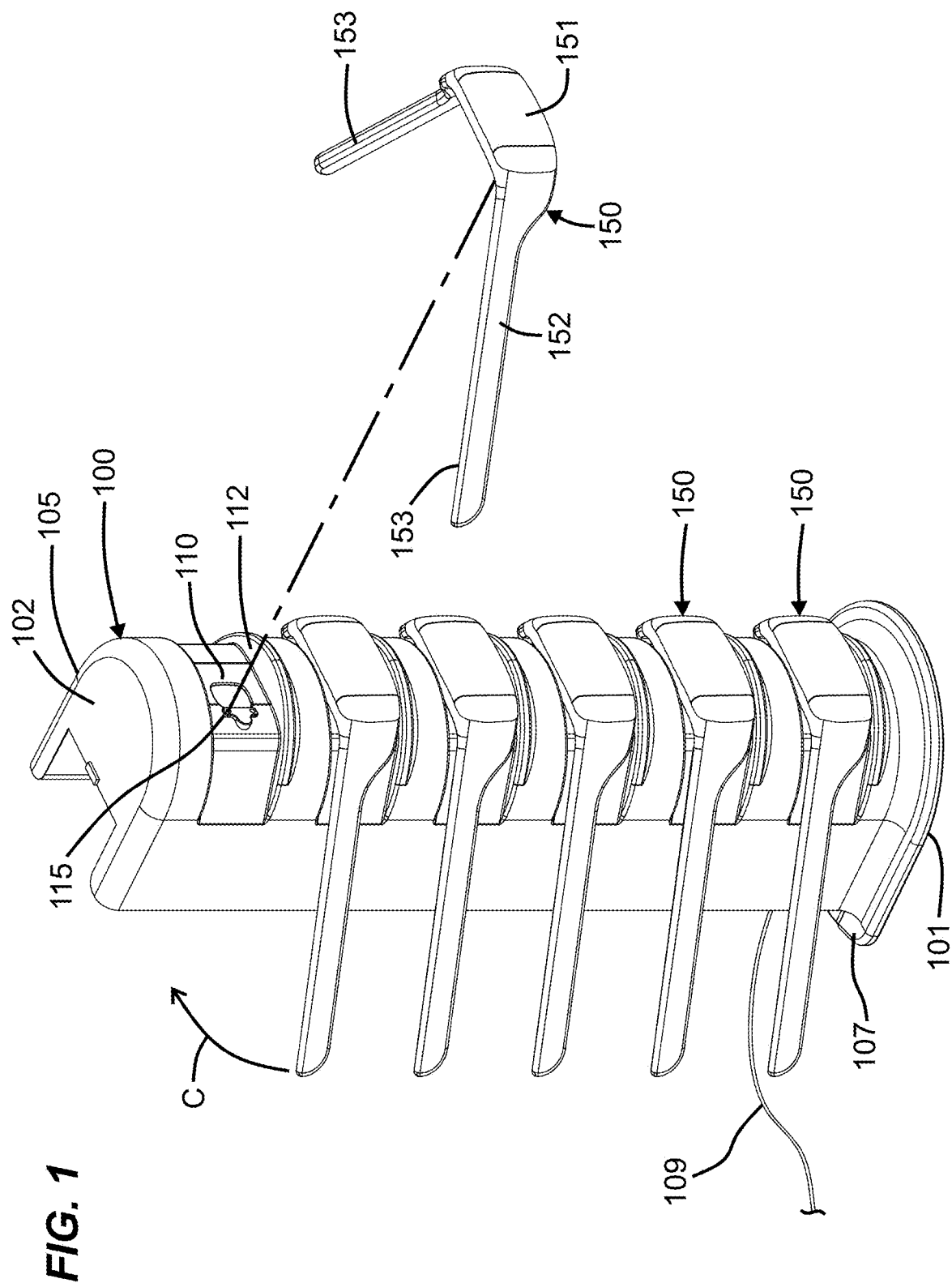
FIG. 1 is a perspective view of example wristband-style electronic devices being mounted to an example charging arrangement configured in accordance with the principles of the present disclosure.
Figure 2A:
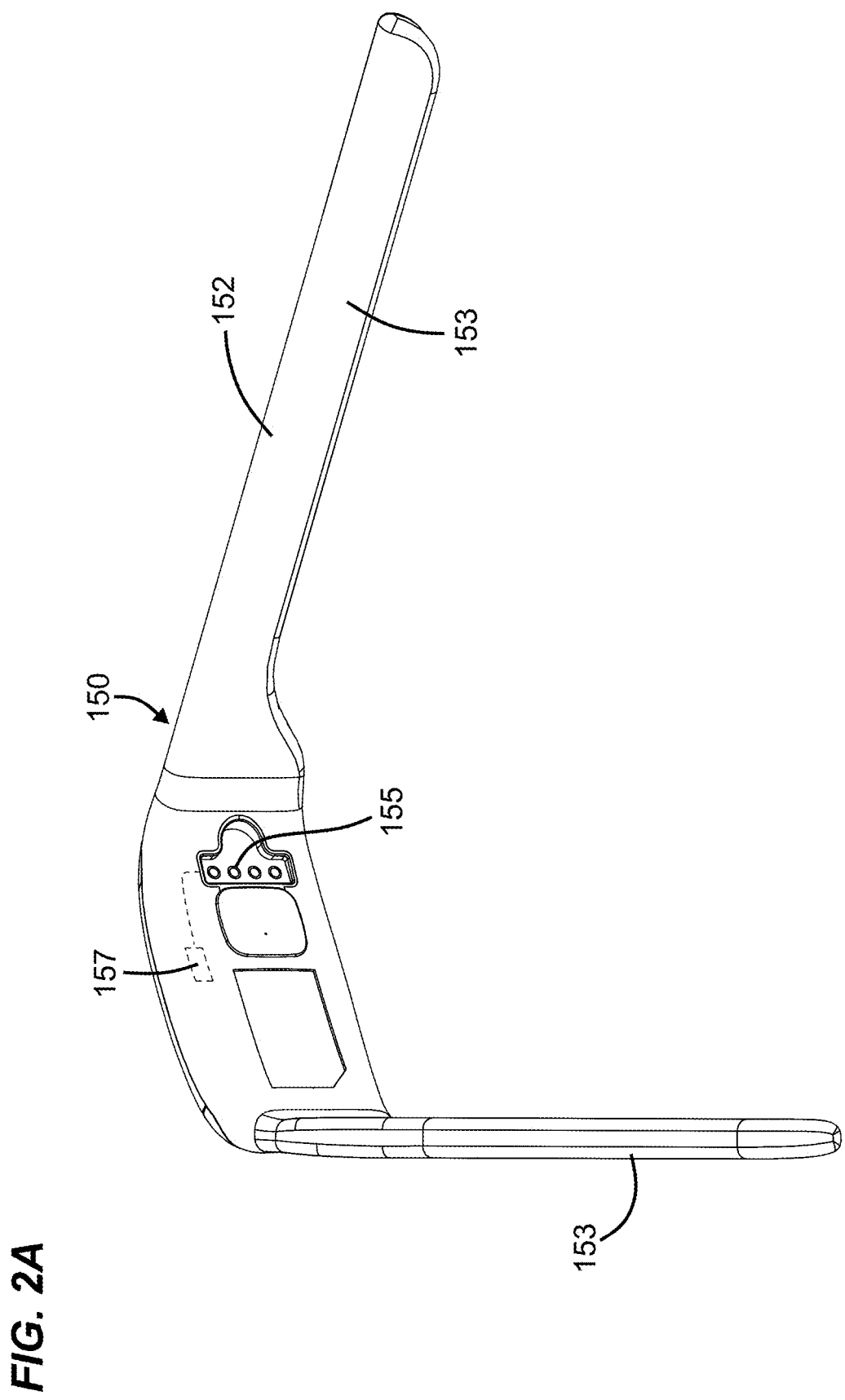
FIG. 2A is a perspective view of an example wristband-style electronic device having an electrical interface through which power can be received from the charging arrangement of FIG. 1.

FIG. 1 is a perspective view of an example charging arrangement 100 at which one or more wearable electronic devices 150 can be charged. The charging arrangement 100 includes a housing 105 defines one or more charging stations 110. An electrical interface 115 is disposed at each charging station 110. A wearable electronic device 150 including a rechargeable power source 157 (FIG. 2A) can be mounted to the charging arrangement 100 at the charging station 110. An electrical interface 155 (FIG. 2A) of the wearable electronic device 150 engages the electrical interface 115 at the charging station 110 to enable power to transfer from the charging arrangement 100 to the rechargeable power source 157.

The charging stations 110 enable multiple electronic devices 150 to be mounted to the charging arrangement 100 simultaneously. In some implementations, the charging stations 110 each charge a respective one of the electronic devices 150 simultaneously. In other implementations, the charging stations 110 alternate in charging the electronic devices 150.

In some implementations, example wearable electronic devices 150 include wrist-mounted electronic devices 150. Wrist-mounted electronic devices 150 include an electronic display 151 mounted to a wristband 152. In certain examples, the electrical interface 155 is located opposite the display 151. In some examples, the electronic device 150 includes a heart rate monitor configured to sense and display (at the electronic display 152) a heart rate of the wearer. In other examples, the electronic device 150 can include a watch, a pedometer, or other such device. The electronics (e.g., the sensor, a processor controlling the display and/or sensor, etc.) are powered by the rechargeable power source 157.

Figure 2B:
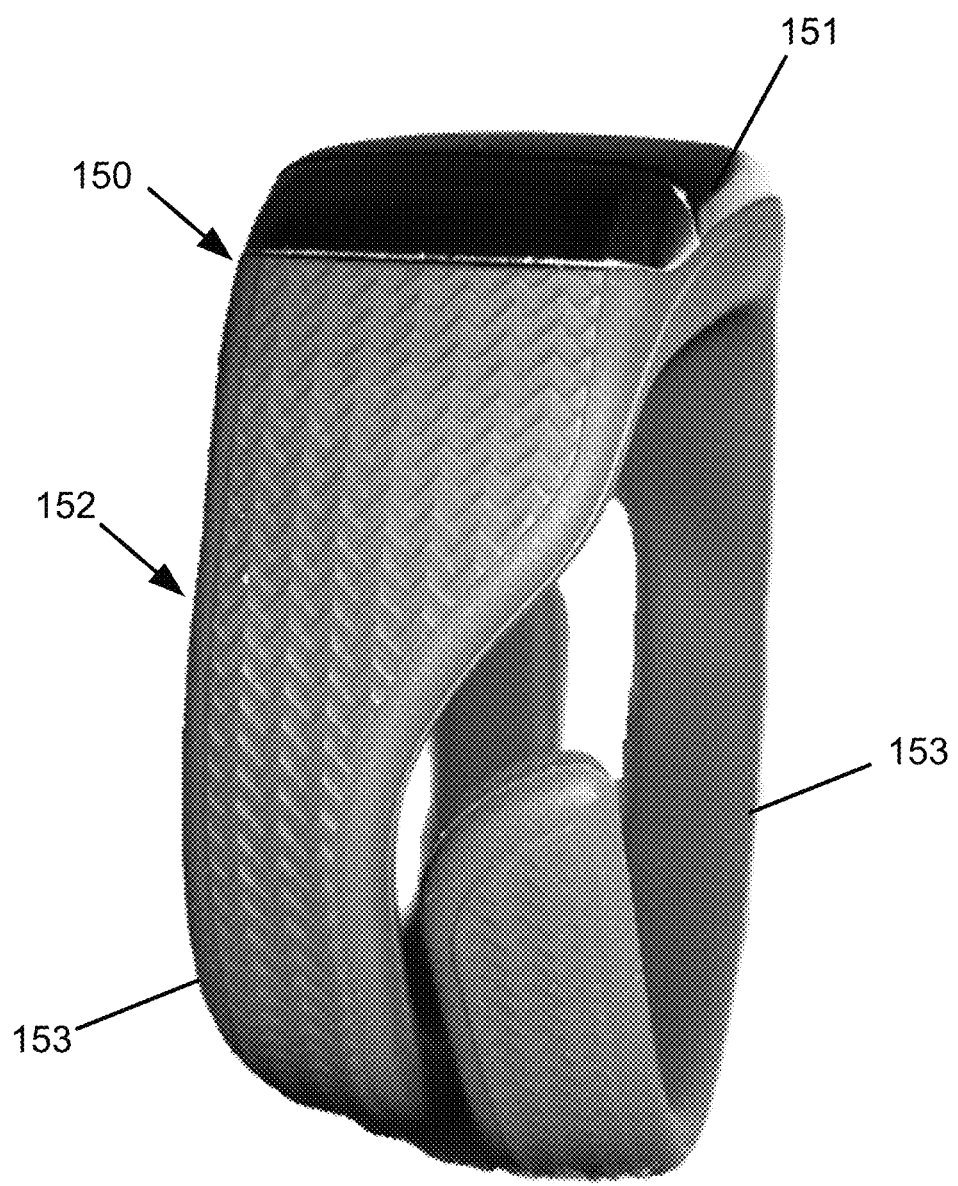
FIG. 2B is a perspective view of the example wristband-style electronic device shaped and configured as worn on a wrist.

In some implementations, the wristband 152 is formable in any of multiple configurations to accommodate various wrist shapes and sizes. In certain implementations, the wristband 152 includes straps 153 that are sufficiently rigid to hold their position until moved by a user. The straps 153 also are sufficiently flexible to enable flexing of each strap 153 along a length of the strap 153 to enable the strap 153 to be wrapped around a wrist of the user (see FIG. 2B). In certain examples, each strap 153 includes a metal wire or plate coated (e.g., dipped, overmolded, etc.) in plastic. In other implementations, the wristband 152 can include a buckle or other fastening mechanism to hold the wristband 152 to the wrist of the user.

Referring back to FIG. 1, the housing 105 extends along a length L (FIG. 5) between opposite first and second ends 101, 102, respectively; along a width W (FIG. 5) between opposite first and second sides 103, 104, respectively; and along a depth D (FIG. 6) between a front 106 and a rear. The charging stations 110 are disposed at the front 106 of the housing 105.

In some implementations, each charging station 110 includes a groove 111 defined in the front 106 of the housing 105. The groove 111 is sized and shaped to receive the electronic device 150 so that at least a portion of the electronic device 150 is disposed in the groove 111. In certain implementations, at least a portion of the wristband 152 is received within the groove 111.

In certain implementations, each groove 111 has a greatest dimension extending along the width W of the housing 105. In some implementations, each groove 111 extends only across the front 106 of the housing 105 and directs the wristband straps 153 towards the sides 103, 104 of the housing 105. In certain examples, the wristband straps 153 of an electronic device 150 leave the groove 111 and extend over an external surface of the housing 105 along the sides 103, 104 of the housing 105. In other implementations, each groove 111 can extending along the front 106 and both sides 103, 104 of the housing 105 to guide the straps 153 towards the rear of the housing 105 without leaving the groove 111.

In certain implementations, the housing 105 is sufficiently sized to enable at least tips of the wristband 152 to wrap around to the rear of the housing 105. In certain implementations, the housing 105 is sufficiently wide so that the wristband straps 153 of the electronic device 150 can extend from the front 106 of the housing 105 towards the rear without extending towards each other. In certain implementations, the housing 105 is wider than the display 151 of the electronic device 150. In certain implementations, the housing 105 is sufficiently narrow that the wristband straps 153 can extend substantially rearward when the electronic device 150 is mounted in the groove 111.

In some implementations, the electronic devices 150 are held at the charging stations 110 by wrapping the ends of the wristband straps 153 about the housing 105 (see arrow C in FIG. 1). In other implementations, the electronic devices 150 are magnetically held at the charging stations 110 as will be discussed in more detail herein. In other implementations, the electronic devices 150 are seated on shelves 112 at the charging stations 110 as will be discussed in more detail herein. In still other implementations, the electronic devices 159 are held at the charging stations 110 using some combination of magnets, shelves 112, and wristband straps 153. For example, wrapping the wristband 152 about the housing 105 may inhibit forward movement of the electronic device 150 relative to the charging station 110 while the shelf 112 inhibits movement of the electronic device 150 along the length L of the housing 105.

In some implementations, the charging arrangement housing 105 is extends along the length L. In certain examples, the length L is the largest dimension of the charging housing 105. In certain examples, the length L is more than double the width W of the housing 105. In certain examples, the length L is more than double the depth D of the housing 105. In certain implementations, the length L is more than triple the width W and depth D of the housing 105.

In certain implementations, the charging stations 110 are aligned in a row along the length L. In the example shown, the charging arrangement housing 105 includes six charging stations 110. In other examples, however, the charging station housing 105 can include a greater or lesser number of charging stations 110 (e.g., two, three, four, eight, ten, twenty, thirty, etc.).

In certain implementations, each charging station 110 extends fully across the width W of the housing 105. In certain implementations, the housing 105 is configured to be oriented so that the row extends vertically. For example, in some implementations, the housing 105 includes a base 107 at the second end 102. The base 107 is configured to seat on a surface and to support the housing 105 sufficient for the housing 105 to stand upright. In other implementations, a rear of the housing 105 is configured to mount to a wall or other vertical surface. In still other implementations, a rear of the housing 105 can be laid on a surface so that the row of charging stations 110 extends horizontally.

Figure 5:
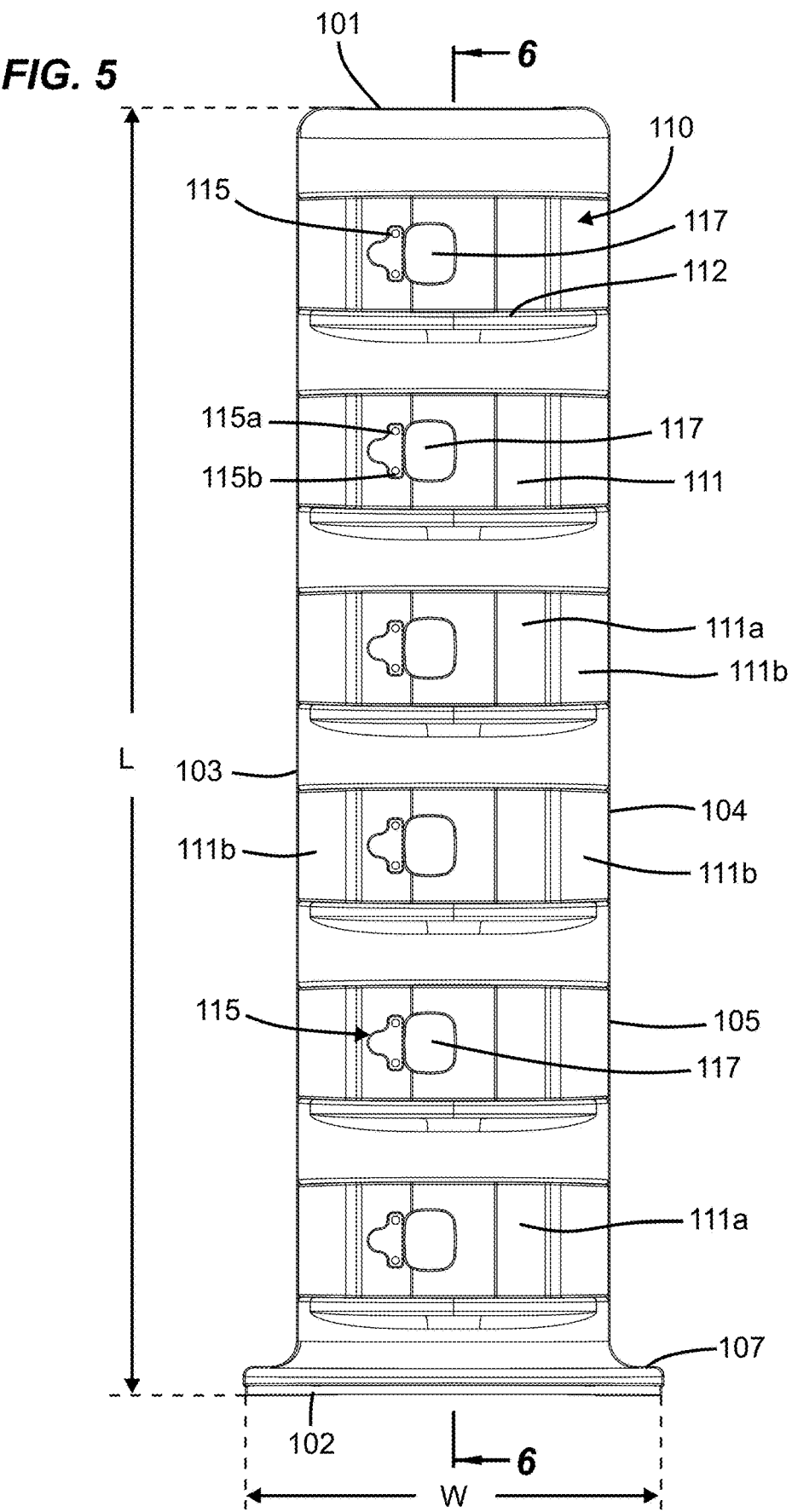
FIG. 5 is a front view of the charging arrangement of FIG. 1.
Figure 6:
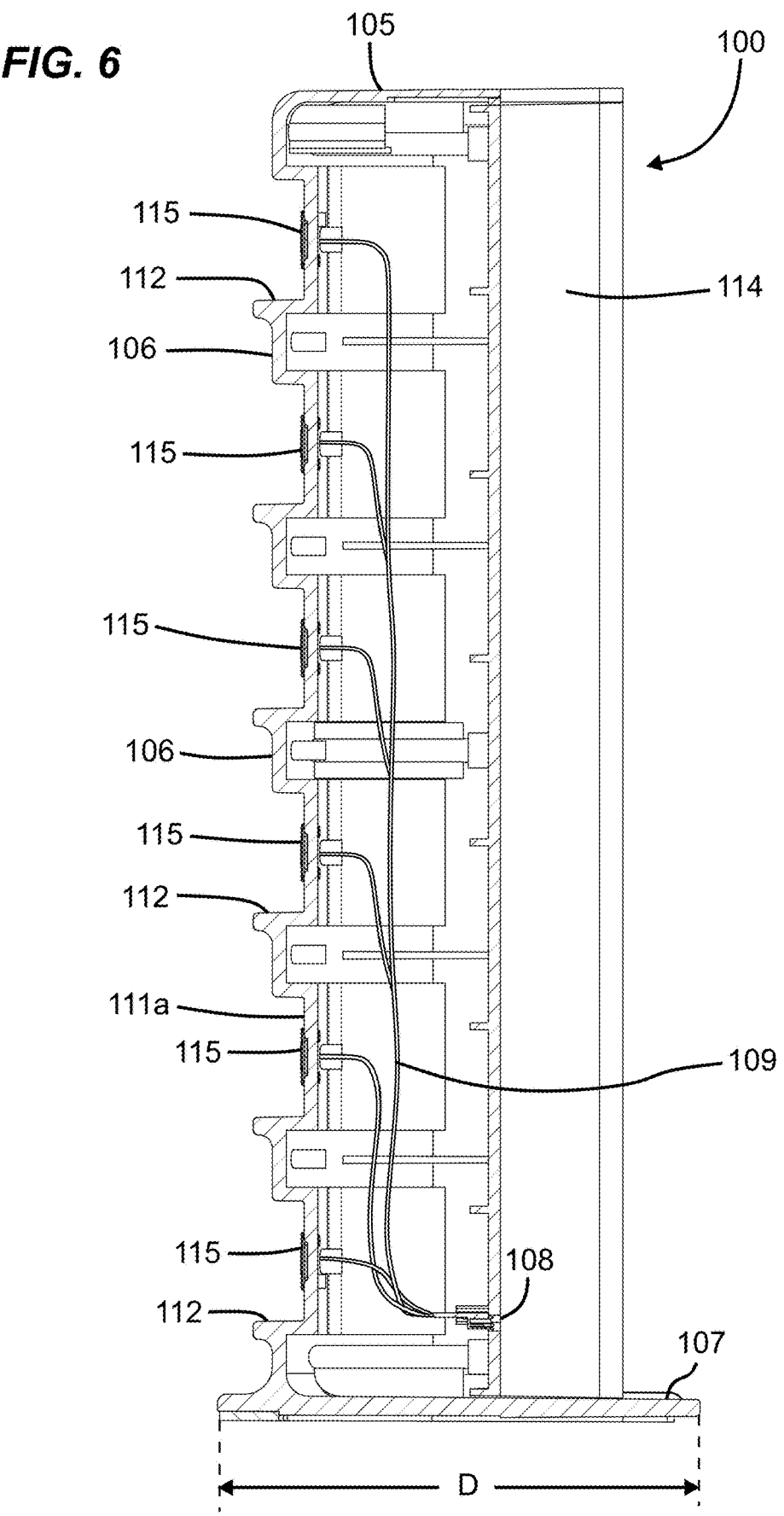
FIG. 6 is a cross-sectional view taken along the 6-6 line of FIG. 5.

FIGS. 3-8 illustrate one example charging arrangement 100 suitable for use in recharging the power sources 157 of the electronic devices 150. In some implementations, the housing 105 of the charging arrangement 100 defines a power port 108 at which a plug of a power cable P (FIG. 1) can be received. In other implementations, a pigtail power cable P can extend from the housing 105 and terminate at an electrical plug connector. As shown in FIG. 6, electrical circuitry 109 extends from the power port 108 (or plug connector) to each of the electrical interfaces 115 at the charging stations 110. Accordingly, power carried over the power cable can be distributed to the electrical interfaces 115 at the charging stations 110. In certain implementations, a voltage manager or other equipment can be connected between the power port 108 and the electrical interfaces 115 to manage how the power received at the port 108 is distributed to the electrical interfaces 115.

Figure 3:
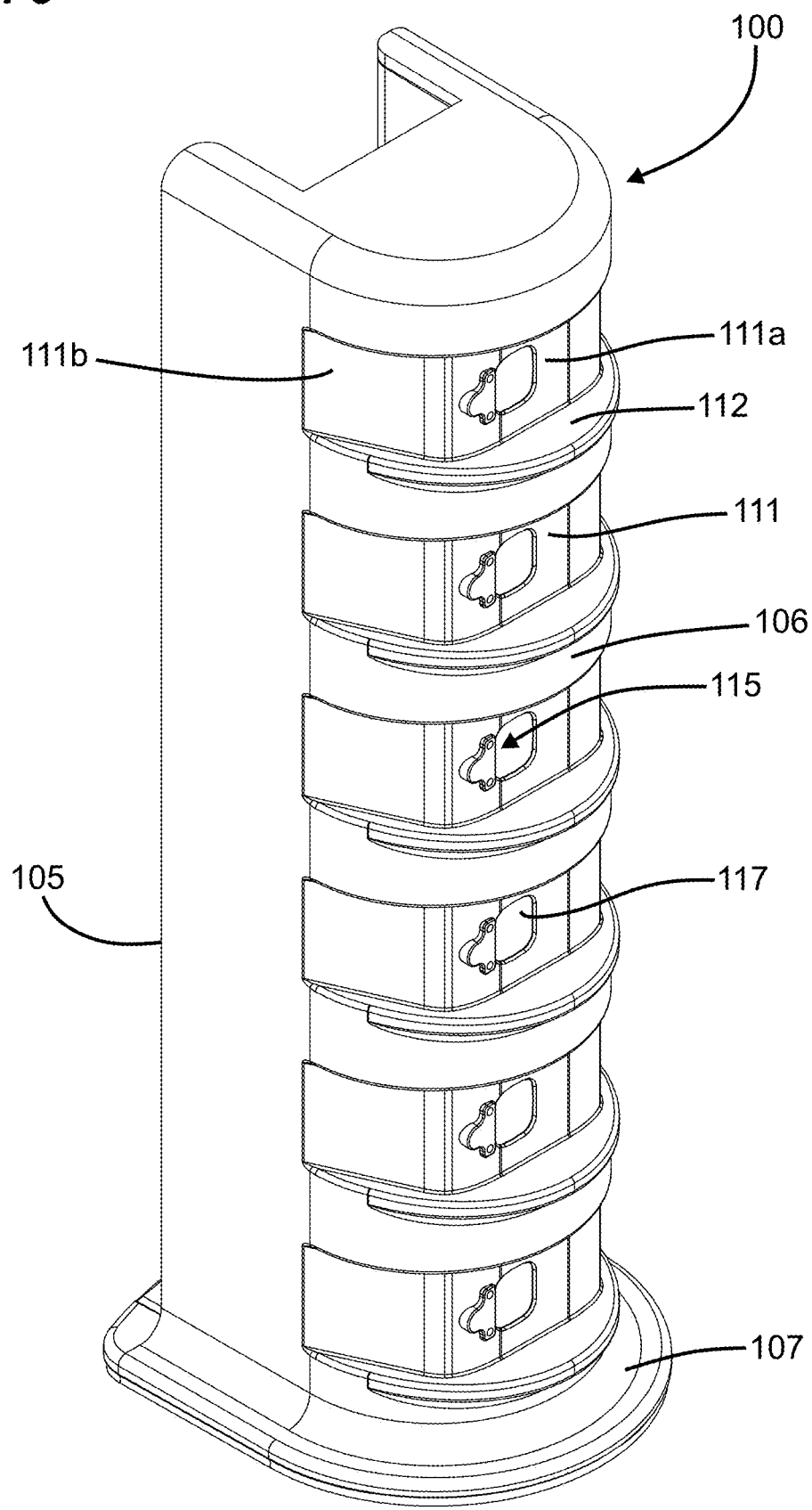
FIG. 3 is a front perspective view of the charging arrangement of FIG. 1.
Figure 4:
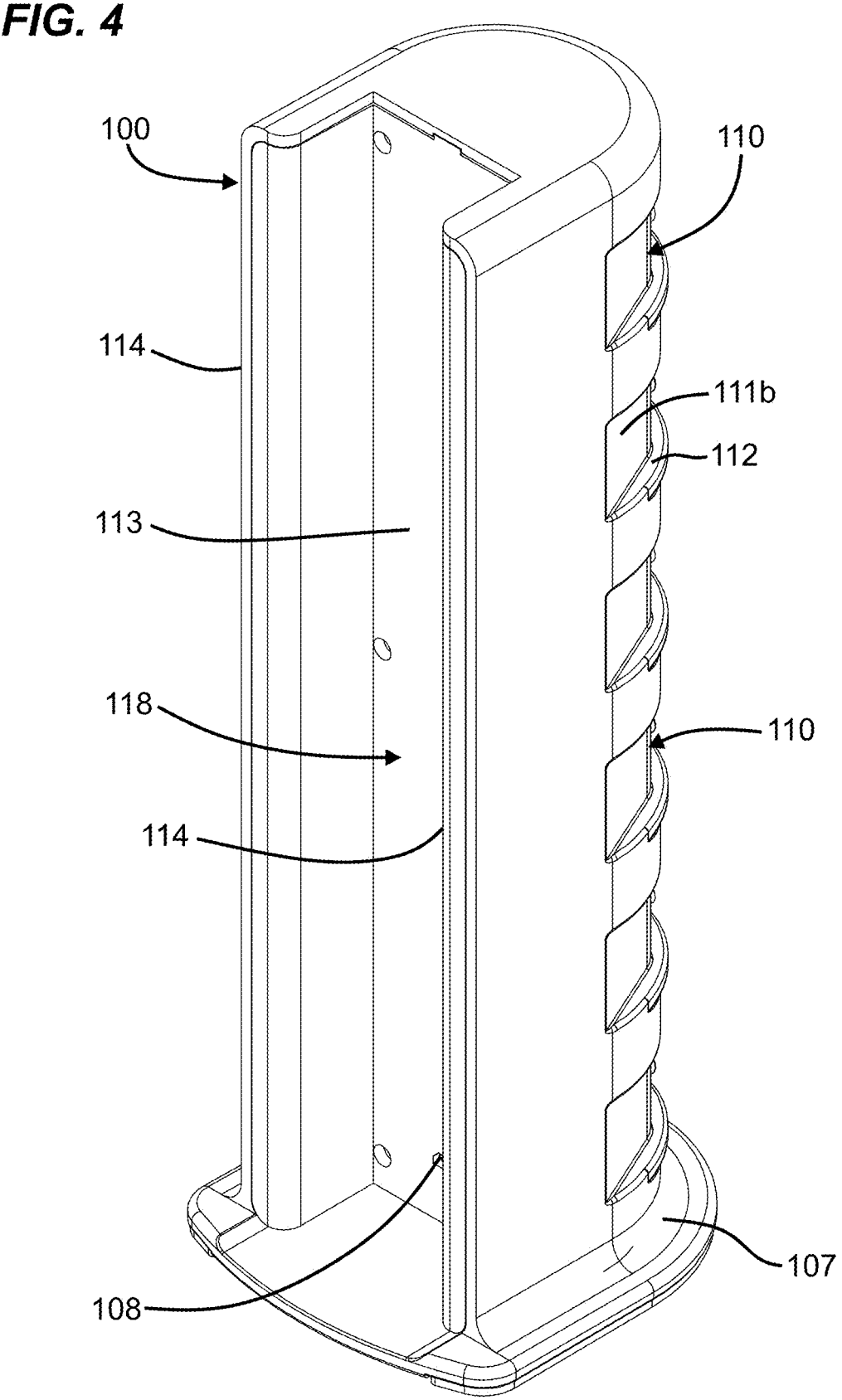
FIG. 4 is a bottom perspective view of the charging arrangement of FIG. 1.

As shown in FIG. 3, in certain implementations, each groove 111 includes a generally flat front section 111a and transitional sections 111b that extend from the front section 111a towards the opposite sides 103, 104 of the housing 105. In certain examples, the front section 111a is sufficiently flat to enable the electrical interface 155 of the electronic device 150 to engage the electrical interface 115 of the charging station 110 without interference. In certain examples, the electrical interfaces 115 of the charging stations include contacts protruding into the groove 111 at the front section 111a. In the example shown, the electrical interface 115 includes first and second contact pins 115a, 115b (FIG. 5).

In certain implementations, a magnetic interface 117 is disposed at the front section 111a of the groove 111. For example, a magnetic interface 117 can include a magnet (e.g., a permanent magnet, an electromagnet, etc.) disposed on or embedded within the housing 105 at the groove 111.

In certain implementations, a shelf 112 protrudes forwardly of the groove 111 at each charging station 110. For example, each shelf 112 may define or bound a bottom of each groove 111. In some implementations, the shelves 112 extend fully across the width W of the housing 105. In other implementations, the shelves 112 extend only partially across the width W of the housing 105. In some examples, the shelves 112 are defined by the housing 105 where the groove 111 cuts into the housing 105. In other examples, the shelves 112 extend forwardly beyond the front 106 of the housing 105 (e.g., see FIG. 6). In certain examples, the shelves 112 do not extend as far forwardly as the base 107.

In certain implementations, the shelves 112 oppose overhang surfaces 113 (FIG. 7) extending between the front section 111a of the groove 111 and the front 106 of the housing 105. In certain examples, the shelves 112 extend farther forwardly than the overhang surfaces 113. In certain implementations, the overhang surfaces 113 cooperate with the shelves 112 to aid in aligning the electronic devices 150 in the groove 111. In certain implementations, the overhand surfaces 113 cooperate with the shelves 112 to retain the electronic devices 150 at the grooves 111.

In the example shown, the front 106 of the housing 105 is curved. In other implementations, the front 106 of the housing 105 could be flat, or angled. In the example shown, the sides 103, 104 of the housing 105 define parallel planes. In other examples, the sides 103, 104 could angle away from each other as the sides 103, 104 extend rearwardly. In the example shown, the rear surface of the housing 105 is flat. In other examples, the rear surface of the housing could be curved to match the front 106 of the housing 105.

In the example shown, the power port 108 is disposed at the rear. In certain implementations, extensions 114 protrude rearward beyond the rear of the housing 105 to provide a protective cavity for the power plug. In certain implementations, the extensions 114 protrude sufficiently rearward that they extend beyond the power plug when the power plug is received at the power port. In certain examples, the extensions 114 are planar with the sides 103, 104. In the example shown, the extensions 114 extend upwardly from the base 107 to the first end 101 of the housing 105. In other examples, the extensions 114 extend only partially along the length L of the housing 105. In certain examples, the extensions 114 extend along less than half the length of the housing 105. In other implementations, the power port 108 can be disposed at the top 101, front 106, side 103, 104 or any other desired surface of the housing 105.

Figure 7:
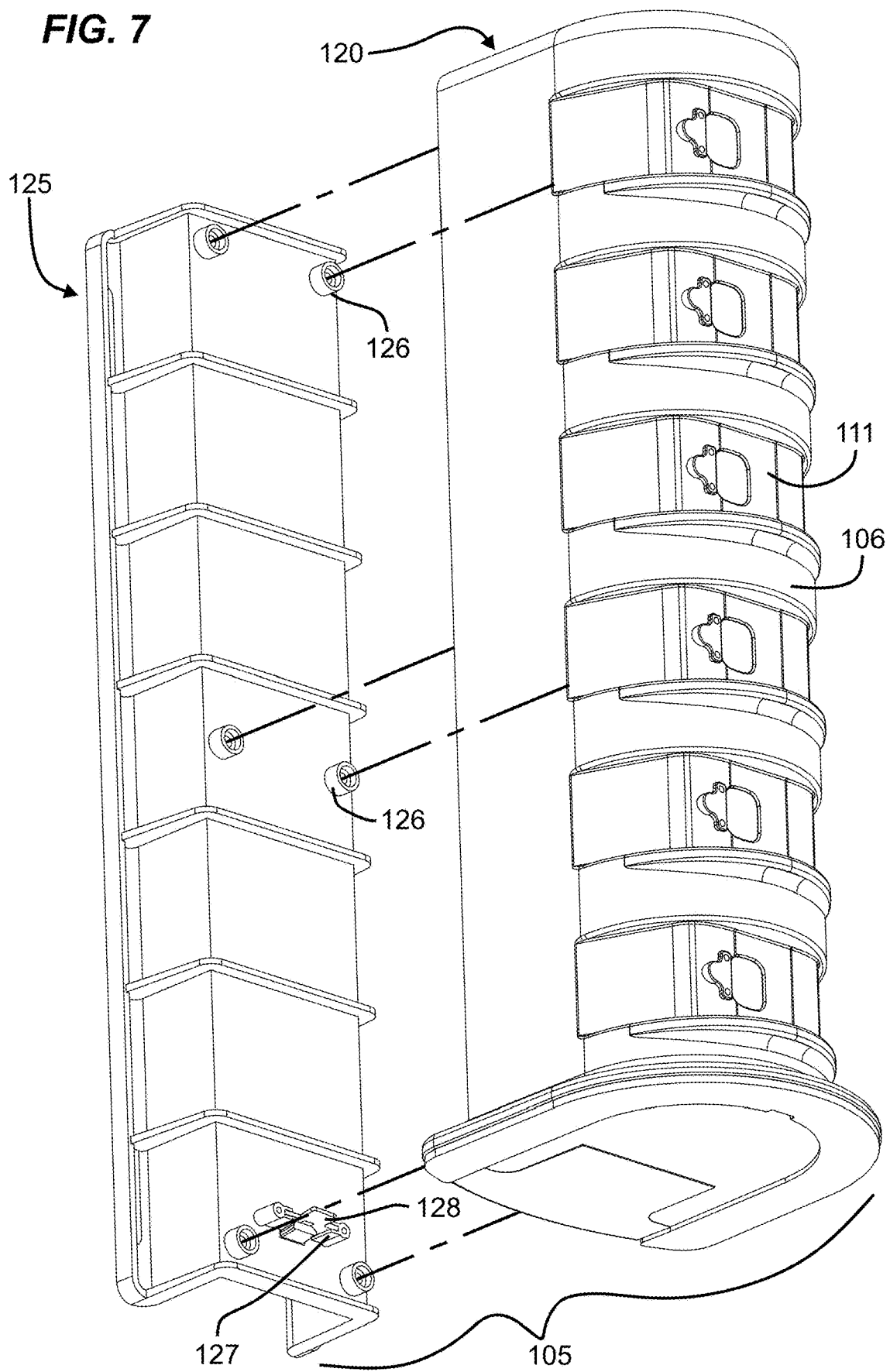
FIG. 7 is a front perspective view of a first housing member of the charging arrangement housing exploded away from a second housing member.
Figure 8:
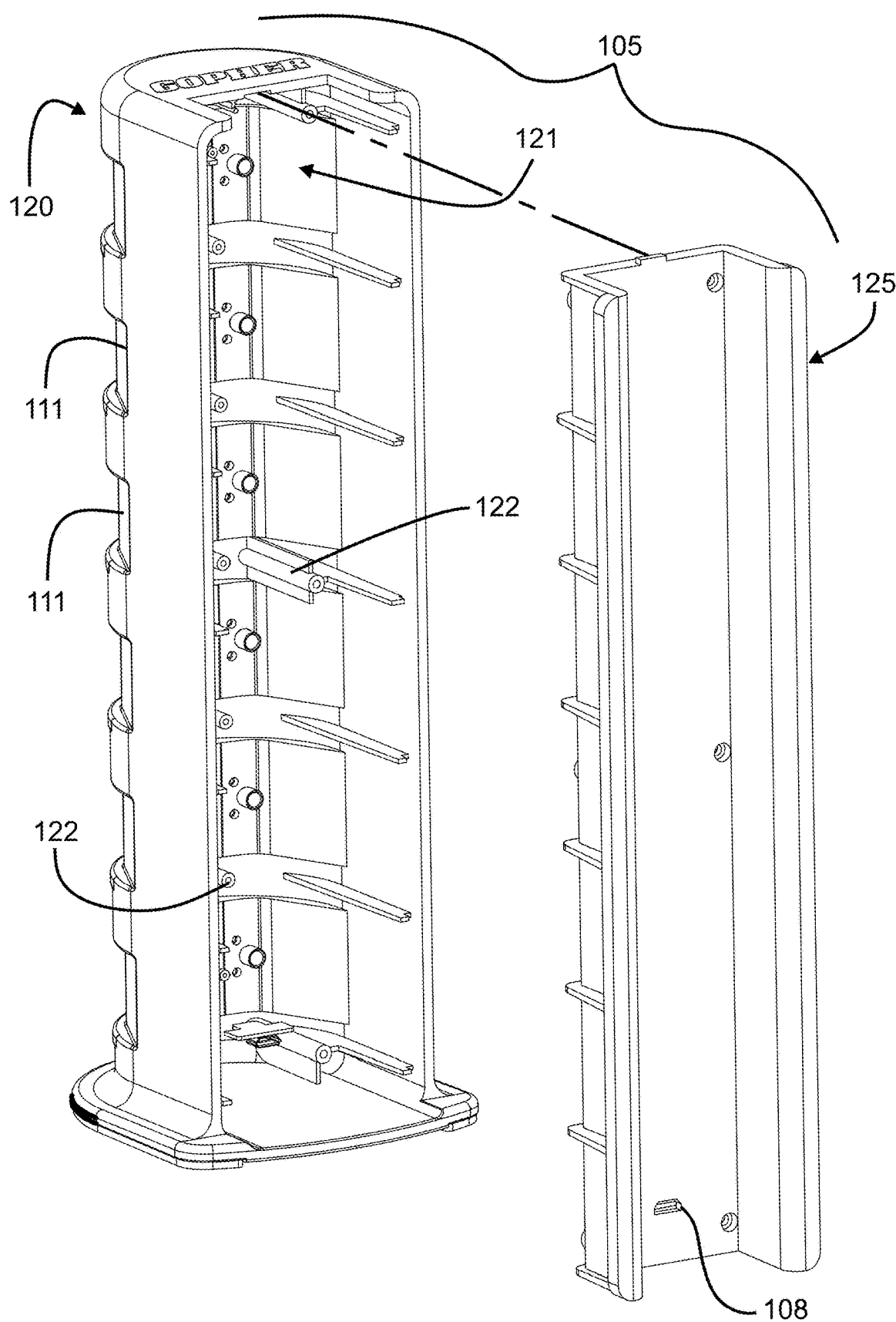
FIG. 8 is a rear perspective view of FIG. 7.

As shown in FIGS. 7 and 8, in certain implementations, the housing 105 can include a first housing member 120 and a second housing member 125 that cooperate to enclose an interior 121 of the housing 105. In the example shown, the first housing member 120 defines a majority of the interior 121. In other examples, however, the second housing member 125 can define a majority of the interior 121. The electrical circuitry 109 is disposed within the interior 121 of the housing 105.

In certain implementations, the first housing member 120 includes the charging stations 110 and the second housing member 125 does not include any charging stations 110. In certain implementations, the second housing member 125 defines the power port 108. In certain implementations, the second housing member 125 includes guide members 127 configured to hold port electronics 128 (e.g., a circuit board) of the power port 108. In certain examples, port electronics 128 can include a power manager (e.g., a voltage regulator), contacts to engage the plug, and/or other equipment.

In certain implementations, the first housing member 120 defines the front 106 of the housing 105 and the second housing member 125 defines the rear of the housing 105. In certain implementations, both the first and second housing members 120, 125 define the extensions 114.

In some implementations, the first and second housing members 120, 125 are configured to releasably connect together. For example, the fastening members 120, 125 may have fastener mounts 122, 126 that align to receive fasteners to hold the housing members 120, 125 together. In other examples, the housing members 120, 125 can latch together or otherwise mechanically attach together. In other implementations, the first and second housing members 120, 125 are non-releasably held together (e.g., welded together).

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A charging arrangement for recharging electronic wristband devices, the charging arrangement comprising:
    a plurality of electronic wristband devices each including a rechargeable power source having an electrical interface, each electronic wristband device having a display carried by a wristband having straps configured to hold the electronic wristband device to a wrist of a user so that the display faces outwardly from the wrist; and
    a housing defining a plurality of charging stations extending in a row along a length of the housing, the housing being configured so that the row extends vertically, each charging station defining a groove in which to receive a respective one of the electronic wristband devices, each groove being recessed into the housing and being sized and shaped to receive a portion of the wristband at which the display is disposed and at least part of the straps of the wristband of the respective electronic wristband device within the groove, the housing defining a power port from which electrical circuitry extends to a power interface disposed within the recessed groove at each charging station, each power interface contacting the electrical interface of the respective electronic wristband device when the electronic device is received at the respective charging station.

2. The charging arrangement of claim 1, wherein the wristband is sufficiently flexible to enable a user to form the wristband in a desired position; and wherein the wristband is sufficiently stiff to hold the desired position once formed.

3. The charging arrangement of claim 2, wherein the wristbands include formable metal plates covered in plastic.

4. The charging arrangement of claim 1, wherein the housing includes a base configured to seat on a surface, the base having a largest cross-dimension of the housing, wherein the housing is configured to stand upright on the base so that the row of charging stations extends away from the surface.

5. The charging station arrangement of claim 1, wherein the charging stations are defined at a front of the housing.

6. The charging arrangement of claim 1, wherein sides of the housing extend rearward and the straps of the wristbands extend over the sides when the electronic wristband devices are disposed at the charging stations.

7. The charging arrangement of claim 1, wherein a shelf is disposed at each charging station to aid in retaining the respective electronic wristband device at the charging station.

8. The charging arrangement of claim 1, wherein the power port is defined at an opposite side of the housing from the charging stations.

9. The charging arrangement of claim 1, wherein each charging station includes a magnet having a first polarity, and each electronic device includes a magnet having a second polarity that is different than the first polarity.

* * * * *